United States Patent
Yananton

(12) 
(10) Patent No.: US 8,101,532 B1
(45) Date of Patent: *Jan. 24, 2012

(54) ABSORBENT PAD FOR ENTRAPPING SMALL AND COARSE PARTICLES, RETAINING LIQUIDS AND ELIMINATING ODORS

(76) Inventor: Patrick Yananton, Toms River, NJ (US)

( * ) Notice: Subject to any disclaimer, the term of this patent is extended or adjusted under 35 U.S.C. 154(b) by 884 days.

This patent is subject to a terminal disclaimer.

(21) Appl. No.: 11/784,759

(22) Filed: Apr. 10, 2007

Related U.S. Application Data

(62) Division of application No. 10/033,862, filed on Dec. 20, 2001, now Pat. No. 7,726,260.

(60) Provisional application No. 60/256,882, filed on Dec. 20, 2000.

(51) Int. Cl.
*B32B 3/00* (2006.01)
*B32B 5/14* (2006.01)
*A47L 17/08* (2006.01)

(52) U.S. Cl. ............ 442/59; 428/170; 428/171; 15/208; 15/209.1

(58) Field of Classification Search .............. 15/208, 15/209.1; 442/381–399, 417
See application file for complete search history.

(56) References Cited

U.S. PATENT DOCUMENTS

| | | | |
|---|---|---|---|
| 3,658,578 A | 4/1972 | Bennett | |
| 3,717,897 A | 2/1973 | Amos et al. | |
| 4,774,907 A | 10/1988 | Yananton | |
| 4,800,677 A | 1/1989 | Mack | |
| 4,826,497 A * | 5/1989 | Marcus et al. | 604/359 |
| 4,861,632 A | 8/1989 | Caggiano | |
| 4,913,954 A | 4/1990 | Mack | |
| 4,963,431 A | 10/1990 | Goldstein et al. | |
| 5,152,250 A * | 10/1992 | Loeb | 119/171 |
| 5,173,346 A | 12/1992 | Middleton | |
| 5,338,340 A | 8/1994 | Kasmark, Jr. et al. | |
| 5,431,643 A | 7/1995 | Ouellette et al. | |
| 5,819,688 A | 10/1998 | Walker | |
| 5,834,104 A | 11/1998 | Cordani | |
| 5,846,603 A | 12/1998 | Miller | |
| 5,961,763 A | 10/1999 | Makoui et al. | |
| 6,129,978 A | 10/2000 | Caldwell | |
| 6,219,876 B1 | 4/2001 | Blum | |
| 6,455,114 B1 * | 9/2002 | Goldhirsch et al. | 428/34.7 |
| 6,458,442 B1 | 10/2002 | McKay | |
| 6,513,184 B1 * | 2/2003 | Brown et al. | 15/231 |
| 6,530,108 B1 * | 3/2003 | Brown et al. | 15/227 |
| 6,550,092 B1 * | 4/2003 | Brown et al. | 15/104.002 |
| 6,569,274 B1 | 5/2003 | Makoui et al. | |
| 6,569,494 B1 | 5/2003 | Chambers et al. | |
| 6,746,974 B1 | 6/2004 | Reiterer et al. | |

OTHER PUBLICATIONS

Aimone, James, Challenges and Opportunities for Designing and Manufacturing Molded and Needled Automotive Products, pp. 869-874.

(Continued)

*Primary Examiner* — Jennifer Chriss
*Assistant Examiner* — Ricardo E Lopez
(74) *Attorney, Agent, or Firm* — John D. Gugliotta, Esq

(57) ABSTRACT

A lightweight, absorbent, disposable pad, and particularly to a lightweight, absorbent, disposable pad that entraps particles, retains liquid, and eliminates odors is provided. The pad can be used in a variety of ways in households, automobiles, and industry. The instant abstract is neither intended to define the invention disclosed in this specification nor intended to limit the scope of the invention in any way.

10 Claims, 2 Drawing Sheets

OTHER PUBLICATIONS

Allen, Jr., H. Charles, The Cotton Fiber Process and Fiber Characteristics, pp. 7-34.
Akers, Paul, Differentiating Superabsorbent Fibers, pp. 119-126.
Angelini, Peter J., Fiber to Web Process—Wet Lay, pp. 567-579.
Gilmore, Thomas F., Protecting Nonwoven Creativity: The Importance of Patents, pp. 890-897, College of Textiles, North Carolina State University.
Arulf, Sandra S., The Polyester Fiber Process and Fiber Characteristics, pp. 59-69.
Bakra, S.K. et al., Neither Woven nor Knit: A New System for Classifying Textiles, pp. 515-523, North Carolina State University.
Behery, Hassan M. et al., Effect of Production Variables on Properties of Ultrasonically Bonded Nonwovens, pp. 657-674.
Blam, A.F. et al., A New Class of Fire Retarding Latexes for Nonwovens, pp. 305-320.
Bodaghi, Ph.D., Hassan, Melt Blown Microfiber Characterization, pp. 441-477.
Bouchillon, Randall E., Bicomponent Fibers Worldwide, pp. 149-159.
Brandon, R.E. et al., Utilization of Glass Fibers in Nonwoven Fabrics, pp. 179-190.
Britton Ph.D., Peter N., Spunlace Processes Worldwide, pp. 613-627.
Calliari, Mark J., Basics of Nonwovens: Converting Processes, pp. 855-867, Green Bay, Wisconsin.
Chou, Lee-Pei H. et al., A Novel Method to Determine the Binder Level in Nonwoven Webs, pp. 413-433.
Cluthe, Dr. Charles E. et al., Rheology Modification of Coatings for Converting Nonwoven Fabrics, pp. 335-366.
Cooke, Theodore F., Superabsorbent Fibers, pp. 99-117.
Davies, Barrie L., New Developments in Bicomponent Fibers, pp. 127-148.
Ettekoven, H. Van et al., Double-Sided Printing, Finishing and Coating with the Screen-to-Screen Technology, pp. 735-744.
Foster, John H., Needlepunching Past, Present, and Future, pp. 681-702.
Gill, R.A. et al., Design of Acrylic Resin Binders for Medical Nonwoven Applications, pp. 367-375.
Goldstein Ph.D., Joel E. et al., Nonwoven Applications for Polyvinyl Alchohol, pp. 271-283.
Goodchild, William C., Compressive Treatment Technology, pp. 757-762.
Hansen, William L., Converting and Product Development Considerations for Pressure Sensitive Adhesive Coated Products, pp. 879-888.
Hardy, Craig, The Rayon Fibre Process and Fibre Characteristics, pp. 35-57.
Hotstetter, B.J. et al., A Monte Carlo Simulation to Predict Tensile Properties of Nonwoven Fabrics, pp. 397-412.
Humphrey, Keith et al., The Application of Image Analysis Within the Nonwovens Industry, pp. 801-824.
Jubilee, Benjamin, Acrylics and Acrylic Copolymer Materials, pp. 197-203.
Kaija, Arnold, Electrostatic and Mechanical Fiber Coating, p. 745-750.
Kelly, David G., The Balance of Strength and Softness in Saturation-Bonded Polyester Nonwovens Used for Interlinings, pp. 839-851.
Kinn, Larry L. et al., Fiber Length-Fiber Surface Area Relationships in Wet-Laid Polyester Nonwovens, pp. 763-775.
Ko, Frank K. et al., Computer Aided Design of Nonwoven Fabrics, pp. 377-396.
Ko, Frank K. et al., Structure and Properties of Carded Glass Composites, pp. 825-838.
Koltisko Ph.D, Bernard M., Vinyl Copolymer Materials, pp. 221-248.
Lochmaier, Wayne, Fiber Classifications and Definitions, pp. 1-5.
Mathews, Grace, Mechanical Finishing, pp. 751-755.
McIntosh, Bruce, Developments in Peek Fibers Opportunities in High Tech Applications, pp. 89-98.
McMeekin, Linda J. et al., Visualizing Structure in Nonwovens, pp. 785-800.
Mercer, Scott A., Innovative Adhesive Application Systems: From Simplicity to Complexity, pp. 655-656, Hendersonville, TN.
Mlynar, Michele F. et al., Processing Aids for Resin Bonded Nonwoven Webs, pp. 249-257.
Johnson, Richard H., Chemical Non-Woven Web Bonding, pp. 629-632.
Johnston, Milo, Resin to Web Process—Meltblowns, pp. 585-604.
Morgan, David J., Bicomponent Fibers, pp. 71-80.
Nelson, David L., Dry Lay Web Forming, pp. 549-566.
Narayan, Ramani, Rationale and Design of Environmentally Degradable Nonwovens, pp. 435-439, Michigan State University.
Pangrazi, Ronald, Low Formaldehyde Nonwoven Binders, pp. 263-270.
Parker, Roy B., Structural Properties of Needlefelts, pp. 605-612.
Powers, Mark, Fiber Spin Finish Technology, pp. 191-196.
Reed, John F., Direct Process Nonwovens: Forming Webs During Fiber Spinning, pp. 81-88.
Riedel, John E., Product Enhancers, pp. 259-262.
Riedel, John E., Nonwoven Web Forming—Fiber Overview, pp. 539-548.
Riedel, John E., Basics of Nonwovens Converting Processes, pp. 853-854.
Rogers, Randall J., Methods, Materials and Products of Thermal Bonding, pp. 633-654.
Ryle, Thomas R., Extrusion Coating and Lamination of Nonwovens, pp. 717-727.
Sabia, A.J. et al., The Effect of Various Silicone Finishes on the Tactile and Physical Properties of Nonwoven Substrates, pp. 321-333.
Scardino, Frank, Evaluation of Nonwoven Fabrics with the KES Testing Equipment, pp. 777-784, Philadelphia College of Textiles and Science.
Shortmann, Walter E., Chemical Treatments for Comfortable Barrier Fabrics, pp. 703-716.
Smorada, Dr. Ronald L., Resin to Web Process-Spunbond, pp. 581-584.
Stark, David E. et al., Foaming Equipment for Nonwovens, pp. 675-680.
Straeffer, Gregory et al, Mechanical and Structural Properties of Melt-Blown Fibers, pp. 479-513.
Stull, Jeffrey O., Converting Processes for Protective Apparel/Devices, pp. 875-877, Austin, TX.
Thompson, Del R. et al., New Fluorochemicals for Protective Clothing, pp. 285-304.
Wilkes, Dr. A.G., A New Viscose Rayon Fibre for Nonwovens, pp. 161-177.
Vandermaas, J.K. et al., Dyeing of Nonwovens, pp. 729-734.
Williams, Martin M. et al., Styrene Butadiene Latex Polymers for Nonwovens Applications, pp. 205-220.
Wadsworth, Larry C. et al., Melt Blown Processing and Characterization of Fluoropolymer Resins, pp. 525-538, The University of Tennessee.

\* cited by examiner

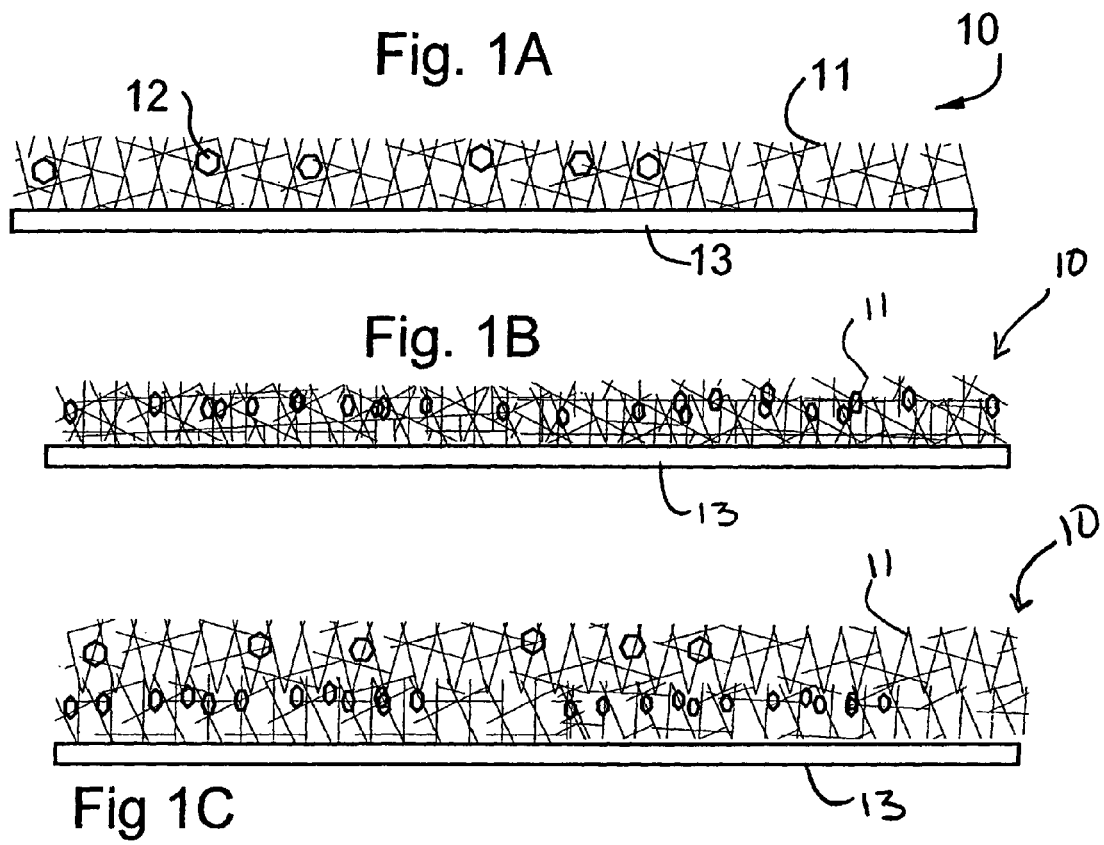
Fig. 1A
Fig. 1B
Fig 1C
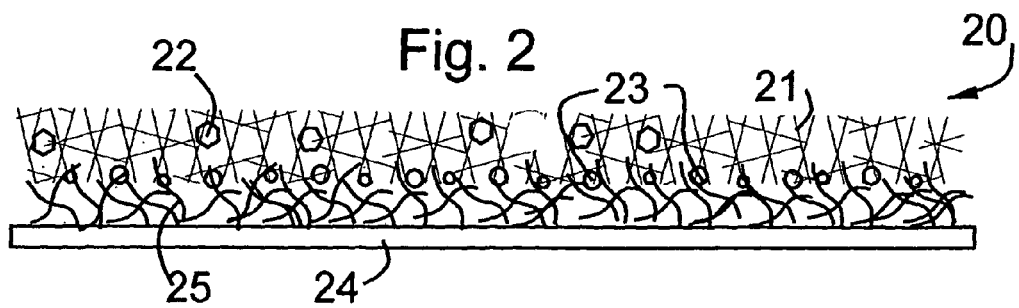
Fig. 2
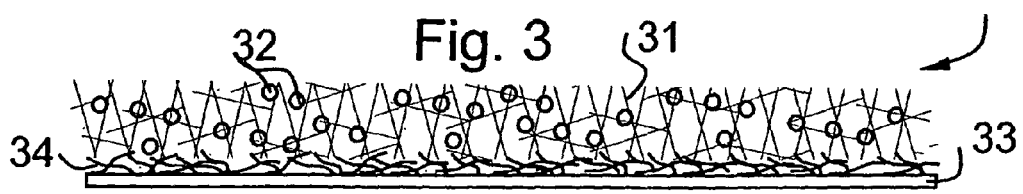
Fig. 3

ABSORBENT PAD FOR ENTRAPPING SMALL AND COARSE PARTICLES, RETAINING LIQUIDS AND ELIMINATING ODORS

RELATED APPLICATIONS

This application is a divisional application of U.S. patent application Ser. No. 10/033,862, filed Dec. 20, 2001 now U.S. Pat. No. 7,726,260, the subject matter of which is incorporated herein by reference thereto as though recited in full. Other co-pending applications that are related are this and the same parent application are the following co-pending U.S. Patent Applications and Patents:

U.S. Ser. No. 60/256,882 filed Dec. 20, 2000;
U.S. Ser. No. 10/033,862, filed Dec. 20, 2001;
U.S. Ser. No. 10/269,713, filed Oct. 11, 2002;
U.S. Ser. No. 10/033,862, filed Dec. 20, 2001;
U.S. Ser. No. 10/745,147, filed Dec. 23, 2003;
U.S. Ser. No. 10/876,310, filed Jun. 24, 2004;
U.S. Ser. No. 60/584,542, filed Jul. 1, 2004;
U.S. Ser. No. 10/975,388, filed Oct. 29, 2004;
U.S. Ser. No. 60/632,981, filed Dec. 6, 2004;
U.S. Ser. No. 11/169,738, filed Jun. 30, 2005;
U.S. Ser. No. 11/472,606, filed Jun. 22, 2006;
U.S. Ser. No. 60/838,089, filed Aug. 15, 2006; and,
U.S. Provisional Application No. 60/898,595, filed Feb. 1, 2007.

The entire disclosure and the contents of the above applications are hereby incorporated by reference and claim the benefits of any provisional applications claimed.

BACKGROUND OF THE INVENTION

1. Field of the Invention

The present invention is directed generally to a lightweight, absorbent, disposable pad, and particularly to a lightweight, absorbent, disposable pad that entraps particles, retains liquid, and eliminates odors. The pad can be used in a variety of ways in households, automobiles, and industry.

The present invention relates to the field of super absorbent compositions in combination with high loft non-wovens used in pads to entrap particles and contain liquids from sources such as people and animals, industrial sites, hospitals, dish racks, flower pots, hazardous material containers and the like. The absorbent compositions are also capable of controlling odors through water evaporation and concomitant reduction of bacterial action. The sorbent compositions are composed of silica aerogels or super absorbent polymers integrated with fibrous materials and assembled in layers into a pad or covering material, which can prevent exposure to users of the absorbent material.

2. Description of the Related Art

Many pet, household, and commercial items and products require the need for a pad that traps and captures stray particles, excessive liquids, or both, preventing them from soiling other areas. For example, many cat litter boxes cause litter particles to escape onto nearby floor surfaces. Some commercially available mats and artificial turf have been sold, which retail for $5.00 to $10.00, and are designed to trap litter. These mats are heavy and expensive. Artificial turf is avoided by many animals due to the sharp, crisp, stiff feel of the turf on their paws. Also, many pet food dishes for dogs and cats do not allow for absorbing spillage of liquids, drinking water, and soft and hard particles of food from these surfaces.

Many mats commercially sold for use around the home, such as dish rack drain mats, and entrance mats can be vastly improved in design, disposability, cleanliness, cost, cleaning ability, absorbency, and odor prevention by using the present invention as a substitute. There are multiple household needs that can be met by the present invention. For example, people with dirty shoes track soil, moisture, and odors into the home, workplace, and public buildings, and refrigerators need a means for absorbing odors and liquids. Additionally, many bathrooms contain soap dishes and bathtub mats that try to contain and absorb excessive soap, drippings, and moisture. Also, most garbage pails or kitchen pails have a need for absorbing leakage that causes odors, and many potted plants overflow when watered or leak soil outside of the pot. In the garage and commercial work place many items can produce dust or shavings from wood, metal, plastics, cardboard, etc. that escape onto and soil other surfaces. In the case of photocopy machines, printers, and other devices that use carbon particle cartridges, much of the dust falls to the floor and other surfaces when cleaning or replacing these items.

Absorbent materials for retaining and confining liquids are well known. Many naturally found materials are capable of confining liquids. Porous, absorbent clays and sands are commonly used in animal litters. Fibrous materials such as cotton and wood pulp are woven into absorbent pads and towels. Even straw is used for animal bedding and absorption or dispersion of wastes. Most of these materials have limitations on their absorbency and are incapable of controlling odors or capturing a variety of numerous heavy or fine particles efficiently.

Absorbent pads are conventionally used for a variety of commercial and industrial purposes. Such pads often are comprised of a liquid-permeable top sheet, a liquid-impermeable back sheet, and an absorbent layer containing a water absorbent resin and a fibrous material provided between the top and back sheets for absorbing and retaining a liquid. Such a pad for use with an animal litter box is described in U.S. Pat. No. 4,774,907 to Yananton. This pad is an improvement in rip-proof non-woven screens for use in combination with a sorbent padding, a liquid impermeable liner, a litter container and litter.

Many different types of media have been used as animal litters for disposing of liquid and solid waste. Among the more popular are clays, wood chip, cedar, alfalfa, corncob, newspaper, and the clumping clay based cat litters that contain silica. Certain litters contain 100% silica crystals. As silica is the main component in sand, rock, and mineral ores, its presence in cat litter is a possible health threat. Silica dust, if inhaled over time, can cause health problems. Silicosis is a lung disease caused by such a problem. Lung cancer and emphysema may also be due to inhalation of silica. As many animal litter boxes are confined within the household, the effects on animal owners and other household members exposed while changing, maintaining, and cleaning these are not known, but common sense dictates that exposure preferably be minimized.

Respiration problems are not the only hazard to consider when keeping an indoor litter box filled with silica crystals or clumping litters. All cats clean their fur and paws and may ingest the silica crystals. Humans, especially toddlers and young children, may be exposed to silica when they have wet hands. Clumping litters and silica crystal litters can cause extreme problems if ingested due to their moisture retaining ability.

Silica crystal litters, in particular, will immediately adhere to a wet surface, be it a paw, hand, mouth, tongue, eyes, or nasal membranes. Fine silica dust can cause extreme irritation to any exposed body parts, as mentioned, and larger silica particles can cause disruption of sensitive mucous membranes on immediate contact due to the extreme attraction of the dry silica to a moist surface.

Several products are on the market that put the pet and pet owners in direct contact with silica particles used as cat box filler. These silica particles contain silica dust, which fracture into smaller particles when wet, and can be tracked into the floor by the cat when exiting the litter box. Small sprays of silica dust can be seen coming from silica litters when wet.

Silica gel remains the highest capacity adsorbent available today. It is synthetically manufactured from sodium silicate. Each small granule is composed of a vast network of interconnecting microscopic pores, which attract and hold moisture by a phenomenon known as physical adsorption and capillary condensation. Hydro sorbent silica gel is inert and has an immense area of internal adsorption.

The dehydration of animal urine exposed to silica gel or crystals is different from the dehydration that occurs by wicking and evaporation in a three-layered pad, as described in the '907 patent. Urine entering a pad that consists of long and short fiber of wood pulp, or super absorbent polymers, quickly wicks away moisture, which evaporates, and prevents bacterial action. Silica gel or crystals dehydrate the animal urine by adsorbing the urine into the silica particles where it becomes bound up and remains entrapped.

Whereas many pet owners may prefer the longevity and anti-odor characteristics of the silica products, they fear direct contact with these products because of the unknown health hazards that may result due to direct or indirect contact with the silica particles or dust. Use of these silica products for other household or industrial purposes places the user at risk and an alternative is needed. For example, silica particles from a litter box can escape and be tracked onto the floor, needlessly exposing members of the household to a potential health hazard. There is a need for containment of such silica particles whether they are being used in litter boxes, under dish racks, flower pots, potted plants, and for wet footwear, etc.

The pads of the present invention can be manufactured easily and inexpensively, are durable, and can be treated with or contain additional odor-counteractive agents, baking soda, silica particles, super absorbent polymers, or combinations of all of the above, as well as oils and anti-bacterials of all natures to enhance the absorbency of particle-entrapping nature of the pad.

Pads can be manufactured as strict particle entrapping, two-layered pads, or absorbent liquid particle trapping three-layer pads.

SUMMARY OF THE INVENTION

In the instant invention, all the problems of excessive moisture, soil, particles and odors of all kind that are generated in every room of the home and work place are solved by the multiple-use, absorbent, particle-catching pad of the instant invention. The structure preferably includes a plastic impermeable bottom layer and a high loft filamentous non-woven top layer. The middle layer, when used in certain applications, consists of wood pulp, plain or treated with super absorbent polymers, baking soda, anti-microbials or odor-counteractive agents. The top layer can also be treated with the above to eliminate odors.

Other substances such as oily, sticky, or static substances can be added to the top layer so as to as enhance particle entrapment by enhancing the cling of the top non-woven. In other embodiments, the non-woven material is replaced by another porous material and in still other embodiments, the bottom layer is made from the same liquid permeable material as the top layer.

An absorbing agent having excellent liquid absorption rate and planar diffusion and a good surface dry feeling, and an absorbent material that uses the absorbing agent can be added to the pad of the present invention. The absorbing agent eliminates the risk of leakage even when used for a long time or used for a thin absorbent material including a high ratio of a water absorbent resin.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1A is a side view of a two-layer particle-entrapping pad designed for fine particles;

FIG. 1B is a side view of a two-layer particle-entrapping pad designed for coarse particles;

FIG. 1C is a side view of a two-layer particle-entrapping pad designed for fine and coarse particles.

FIG. 2 is a side view of a three-layer particle-entrapping pad designed for fine and course particles and for liquid absorbency;

FIG. 3 is a side view of a kitty litter pad comprising a three-layer particle-entrapping, liquid-absorbing pad containing litter within the nonwoven top layer;

DETAILED DESCRIPTION OF THE PREFERRED EMBODIMENTS

Figure 4:
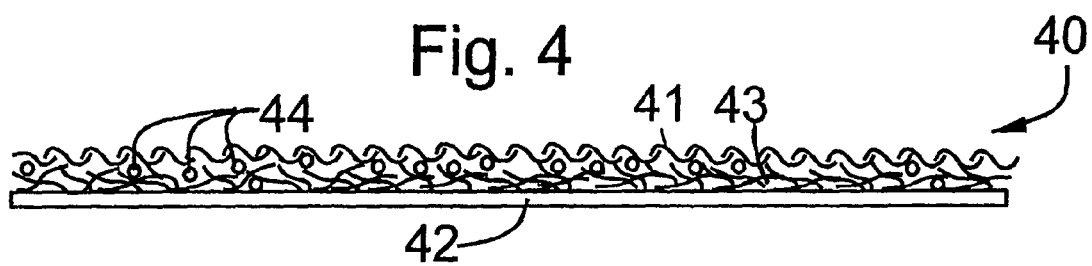
FIG. 4 is a side view of a moisture-trapping pad for household or commercial use.

The instant invention is a combination particle entrapping, liquid absorbing and odor-reducing pad for use in home, industrial and clinical situations. The pad is similar in design to that described in U.S. Pat. No. 4,774,907 to Yananton, which is incorporated herein by reference as though reproduced in its entirety.

The pad includes at least a top layer and a bottom impervious layer. Optionally, the pad can include a middle absorbent layer. FIG. 1A shows one embodiment of a two layer particle entrapping pad 10 for fine particles. A high loft non-woven top layer 11 is secured to a plastic liquid impervious bottom layer 13. Top layer 11 traps fine particles 12. Once the particles 12 are trapped within the non-woven, they either fall to the bottom of the pad 10 or remain suspended within top layer 11. FIG. 1B shows a two layer particle-entrapping pad for coarse particles. A high loft non-woven top layer 11 is secured to a plastic liquid impervious bottom layer 13. Coarse particles 14 are trapped in the non-woven layer 11. In the embodiments of either FIG. 1A or 1B, additives such as oil or surfactant can increase the holding capacity of the top layer 11, or static charge for additional cling can be maintained by the composition of the fibers or added ingredients. Additionally, deodorants such as baking soda can be added either top layer 11 or between layers 11 and 13. Top layer 11 is made from a variety of high loft non-wovens as shown in FIGS. 1A and 1B. This top layer is used to entrap particles, and, therefore, the non-woven used depends on the kind of particles the user wants to entrap. The denier or density of top layer 11 non-woven can be varied or combined to trap and hold large particles as shown in FIG. 1A, small particles as shown in FIG. 1B, or both as shown in FIG. 1C.

Bottom layer 13 is made of a plastic sheeting such as polyethylene or polypropylene. This layer will not allow liquid to pass through, protects surfaces below it from moisture, and acts as a supporting device for installation and disposal of the invention described. Adhesive strips, drawstrings, or elastic can be added to bottom layer 13 so as to make adherence to another surface or container more secure.

An optional middle layer can be incorporated into the pad as shown in FIG. 2 thereby creating a three-layer pad 20 with the ability to trap fine and coarse particles and to absorb liquids for evaporation or convenient sequestration. A high loft non-woven top layer 21 is secured to a plastic liquid impervious bottom layer 24. A fiber 25 with super absorbent polymer serves as an intermediate layer to increase both particle trapping and liquid retention. Course particles 22 and fine particles 23 are trapped in the non-woven layer 21, while liquids that flow through the middle fiber 25 are stopped at the impervious bottom layer 24.

Absorbent middle layer 25 is made of wood pulp or fluff by itself or enhanced with super absorbent polymer. To middle layer 25 baking soda, silica gel, antibacterial agents, or antifungal agents can be lidded. The middle layer 25 can even consist of almost pure baking soda or silica gel trapped between the top layer and impervious bottom layer. Absorbent middle layer 25 is used in embodiments wherein the use of the pad is liquid absorption.

A super absorbent polymer can be incorporated as middle layer 25 of the pad. This super absorbent polymer, known generically as a silica aerogel or hydrated silica, includes such compositions as silicon dioxide, silicon carbide, elemental silicon and various sodium silicate salts. Super absorbent polymer can be purchased from manufacturers such as GELOCK in Dayton, Ohio, which sells super absorbent polymer alone or with baking soda included in a desired ratio. The preferred composition contains amorphous silicon dioxide. These compounds are highly absorbent and available in a variety of particle sizes. The various particle sizes and their absorption characteristics are described in the manufacturer's specifications enclosed herein. They can be readily formed into silica gels. Although generally considered nontoxic, silica gels are so absorbent and capable of binding tightly to wet surfaces that an inherent risk exists upon accidental ingestion. Use of the silica gels alone as a desiccant or super absorbent polymer increases the risk of accidental ingestion; however, incorporation of these materials into the pad described in the '907 patent effectively removes any risk associated with ingestion of the free compound. This is particularly important when they are used in the household, for example in animal litters or for spill prevention.

A preferred embodiment of the present invention provides an absorbent pad comprising a liquid-permeable top layer, a liquid-impermeable bottom layer, and an absorbent middle layer provided between the top and bottom layers, wherein the absorbent middle layer comprises the above mentioned water absorbing agent and preferably a non-woven. A non-absorbent high-loft non-woven, which can capture large or small particles, is attached to the impervious bottom layer 42 by cold glue or hot-melt glue. This non-woven is useful to distribute the moisture and reduce the quantity of absorbent material required. A silica gel having excellent absorption rate of a liquid and planar diffusion with a good surface dry feeling without the risk of leakage even when used for a long time combined is the preferred absorbing material.

Application of the silica crystals to the pad can be performed in a number of ways. Application of silica crystals directly to the impervious bottom layer takes place on an underpad-laminating machine when a hopper can deliver fine and/or coarse silica crystals to the plastic sheet. Later on in the process, the top layer is added and glued by cold glue or hot melt to the sheet. Where less silica is used, the fine and/or coarse silica particles can be added to a layer of wood pulp or fluff as is commonly known to the art rather than added directly to the plastic sheet. By adding silica to the newly shredded wood pulp-fluff middle layer, each crystal becomes suspended in the matrix of fibers. Not only do these fibers transport liquid out and away from the source of input, but also moisture becomes trapped by the silica. Hence the manufacturing steps outlined herein can result in a three-layered pad of which the middle layer of short and/or long fibers of wood pulp or fluff also contains silica crystals.

The middle layer of very adsorbent granular silica, synthetically manufactured from sodium silicate can contain a built-in indication that turns from blue to pink, signaling saturation, or can be clear or white in color. Particle size can range from fine to coarse depending on cost and manufacturing concerns, case of handling, longevity, etc. Silica absorption can range from fast absorbing to slow absorbing with a holding capacity of over 85% to 95%. Crystals can be round or irregular in shape.

For entrapping coarse and fine particles, a variety of inert, non-absorbing high-loft non-wovens exists which can be used as the wadding and to retain the water absorbing material.

Examples of this high-loft non-woven include polyester, nylon, polypropylene and the like and these can be manufactured in a variety of thicknesses and densities as may be desired by the user or needed for the use. The denier for these materials can range from thick with relatively sparse thread count to thin with very high thread count. These non-woven materials can be manufactured with a tacky material applied so as to allow crosslinking and easy integration of the absorbent material, they can be sprayed with a binding agent so as to join the fibers at the points of junction and provide easy integration of the absorbent material, or they can be needle punched to integrate fibers. Union Wadding Inc. in Pawtucket, Rhode Island and Hollinee Filtration in Texas, as well as many other non-woven suppliers supply non-wovens in all types of lengths, widths, etc. with or without binding agents or tacky materials applied.

In a preferred non-woven construction, the top of the non-woven is open and the fibers are spread apart, allowing for rapid particle entrapment, while the further down the particles sink, the more dense the fibers are entangled, allowing for peInlanent entrapment. The base of the non-woven is relatively flat, allowing for the placement on the plastic impervious layers.

The middle non-woven layer can be made of fibers both short and long from wood pulp or fluff. This layer can also contain particles of silica, baking soda, activated carbon, or a super absorbent polymer to further aid in the absorption and evaporation associated with odor control.

The invention provides a use of the layered super absorbent pad in a variety of settings. In one embodiment, the pads are provided as an animal litter trapping for cats, dogs and other animals. The top layer allows liquids to pass but can be designed as claw proof and resistant to scratches. The pads can be used in to protect against spills near the feeding areas or as an insert in, under, or around litter boxes, animal crates, and birdcages.

In litter boxes, a preferred use is underneath a layer of commercially available litter or underneath a grating or screen to prevent the animal from shredding the various layers with their claws. A preferred claw proof or rip proof top layer or screen material can be provided for this use that retains the silica, its fragments, and dust in the pad, while allowing urine and air to pass into the interior of the pad. In effect the top layer acts as a rip-proof filter, allowing urine and air to enter, trapping silica particles, fragments, and dust within the pad, keeping feces and litter, if used above the screening, separated from the silica particles. The top layer can also be sprayed with a scent or pheromone that causes the animal to urinate or defecate directly on the pad.

Another preferred embodiment for cats is use as a kitty litter pad. FIG. 3 shows one embodiment of a litter pad wherein an impervious bottom layer 33 is attached to a high-loft non-woven top layer 31 and having a middle absorbent layer 34 comprised of fluff or super absorbent polymer. In this embodiment the top layer 31 is impregnated with cat litter granules 32. The litter pad is a dry, prepackaged pad that is inserted into a cat litter box, thereby replacing the need for litter and liner. Cats, seeing the litter suspended in the pad, use it as they would ordinary litter. Urine becomes trapped in the litter within the top layer 31, falls down into the middle absorbent layer 34 where it dries out. This drying action prevents odors. The bottom layer 33 supports the other layers and prevents moisture from reaching the litter box. When the pad is soiled, the owner simply disposes of the entire pad and replaces it with a clean pad. The litter used in this design can be any litter, but can preferably safely hold silica crystals. The layers of the pad hold these silica crystals within the pad and prevent them from becoming loose within the household. This is critical since these crystals, if ingested by humans or animals, can be deadly, and at the very harmful to one's health.

In animal crates or birdcages, the pads can be placed underneath said crate to serve as a means for protecting against contamination and spreading of wastes. Alternatively, the pads can be placed within the crate with a covering placed on top of them. Using the pads in this fashion is particularly important in zoos, commercial boarding operations for pets, animal research labs and animal rescue operations where easy cleanup and waste containment to avoid odor and/or spread of disease is desired. The odor control capability of the absorbent material is particularly critical where various species of cats are housed as cat urine contains a high concentration of urea that is metabolized by bacteria to produce ammonia, a strong and noxious odorant.

In another embodiment, the pads can be used in household and commercial situations where fluids and particles are stored, removed and/or replaced in vehicles, appliances, office machines, vending machines and the like. The pads can be placed underneath said machine, appliance or vehicle to contain leaks and prevent spreading or contamination. Cleanup becomes easy and contamination is minimized, reducing the costs associated with these activities.

In another embodiment, the pads are produced with the high 10 ft non-woven matrix and are used when toner is changed or added to photocopying machines. This embodiment prevents the toner from spreading over the surfaces of the copier and reduces or prevents contamination of the critical surfaces within the copier machinery.

In another embodiment, a layered pad is used as a mat—a floor mat or car mat. In this embodiment, a layered pad is provided comprising a bottom impervious layer of plastic and a top layer of a fibrous high loft non-woven capable of entrapping fine or coarse particles. As particles from people and animals, footwear, metalwork, woodwork, copy machines and the like are generated, they immediately encounter the high loft non woven which immediately immobilizes and entraps them, preventing them from scattering. The filament count of the non-woven can be varied so as to increase the effectiveness of trapping smaller or larger particles. An oily film can be optionally applied to the fibers to make them more sensitive to entrapping extremely small particles and hold them firmly to each fiber.

If absorbency is required, a layer of sorbent material can be optionally added between the bottom impervious layer and the top non-woven layer, whereby both particles and water are trapped by the various layers. For example, water and dirt from footwear can be trapped or wet food and water from a pet food dish can be trapped in this combination. Water is entrapped in the middle layer and prevented from flowing through onto surfaces by the impervious bottom layer while particles are retained by the top layer. Deodorants such as baking soda, antibacterial agents, anti-fungal agents, and any other odor-counteractive agent can be added to the pad of this embodiment. A pad used as a doormat or car mat can be used alone or easily attached over an existing mat using adhesive, elastic, or other attachment means. Pads used for doormats and car mats can be colored or decorative. Also, pads can be configured into a variety of sizes including floor runner sizes, preferably 6-8 feet long by 3 feet wide.

Household uses of the absorbent material include placement within houseplant containers to reduce spills due to over watering, placement within the drip pan underneath refrigerators to collect and retain condensed water, and use in bathrooms, kitchens, and laundry rooms to absorb liquid from persons, appliances, fixtures, and objects. Excess moisture buildup on objects within the household such as air conditioners, dishdrain mats, sinks, and thawing food, just to name a few, can be the cause of the buildup of bacteria, fungi, stains, and odors. These phenomena can be eliminated by the use of a three-layered pad that can entrap and evaporate moisture.

Whether the moisture build-up occurs underneath dish racks, flowerpots, potted plants, soap dishes, or coasters; by condensation on windows, pipes, or air conditioners; or by use of showers and bathtubs, the need for a device to catch, hold, absorb, lock in, or evaporate is the same. For these uses, an exemplary pad consists of a bottom impervious layer, absorbent desiccant middle layer and a top protective layer of preferably a non woven design to protect the layers below and allow the moisture to enter as liquid and exit as vapor. The middle layer can be made of short and long fibers from wood pulp or fluff This layer can also contain particles of silica, baking soda, activated carbon, or super absorbent polymer to aid in the absorption and evaporation. Of particular note, pads used in bathrooms as bath mats can be treated with antibacterial and anti-fungal agents to prevent spread of germs and disease. This is especially useful in public wash facilities.

FIG. 4 shows one embodiment of a moisture trapping pad for household or commercial use. An impermeable bottom layer 42 of polypropylene or equivalent is attached to a fibrous layer 43 comprised of wood pulp fibers or fluff and a super absorbent polymer 44 which is then capped with a porous top layer 41 which allows liquids to pass through. Liquids that pass through the top layer 41 are absorbed by the super absorbent polymer 44, and any excess liquids are prevented from spillage by the impervious bottom layer 42.

Another household use includes lining the bottoms of garbage pails, waste pails, commercial disposal pails, and other receptacles in order to provide protection from dripping waste and particles. Pads for this use may consist of similar construction as previously described or can be of simpler structure, omitting the particles catching high loft non-woven layer, replacing it with a standard rip-proof non-woven polypropylene, nylon, or polyester sheet. Silica gel, baking soda, super absorbent polymers, odor-counteractive agents, etc. can be added to the middle layer. The wood pulp fibers of the middle layer also promote evaporation to negate odors.

Figure 5A:
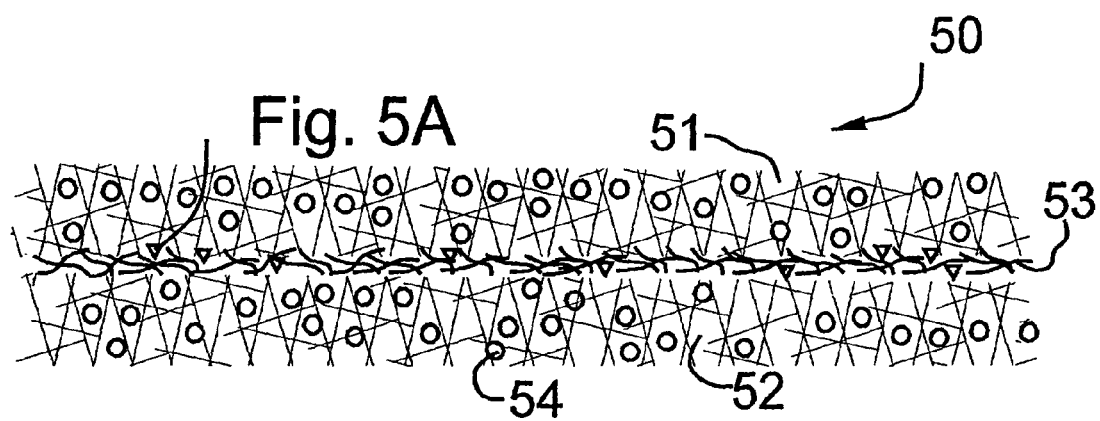
FIG. 5 is a side view of a moisture and odor entrapping pad for household or commercial use.
Figure 5B:
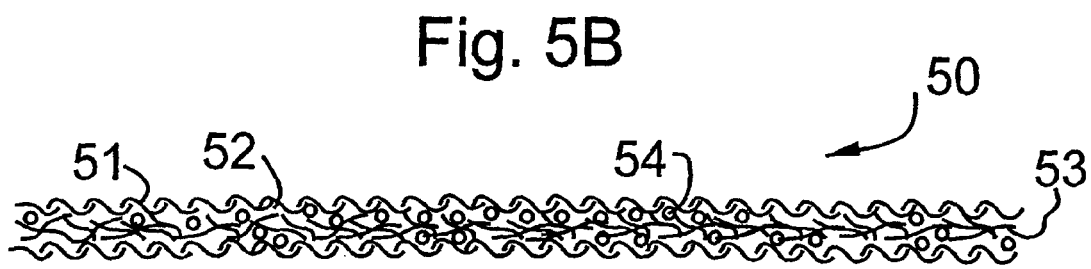

In another embodiment, as shown in FIG. 5A, a pad can be developed wherein the bottom layer is the same as the non-woven top layer, i.e. there is no impervious bottom layer. These two non-woven layers 51 and 52 are attached to form a kind of pouch 50. This pouch 50 preferably contains a middle layer 53. Middle layer 53 can include a super absorbent polymer or baking soda particles 54 or both. This pouch 50 can be used in any environment, most notably a refrigerator, to reduce odor and humidity. Further, in another embodiment, as shown in FIG. 5B, the non-woven layers 51 and 52 can be made of porous or fibrous materials attached to form a pouch 50. The pouch 50 also contains a middle layer 53 and can include super absorbent polymer or baking soda particles 54 or both. The pouch 50 in FIG. 5B, can be used in the same manner as the pouch 50 in FIG. 5A.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

I claim:

1. A particle entrapment pad comprising:
    a liquid-impermeable back sheet;
    a first bonded highloft nonwoven top sheet;
    an absorbent space provided between said bonded highloft nonwoven top and said back sheet, and,
    a tacky material applied to said bonded highloft nonwoven top sheet, said tacky material provides a means to make spaces between crosslinking fibers of said nonwoven top sheet tacky;
    wherein said absorbent space holds or contains at a water absorbing agent.

2. The particle entrapment pad of claim 1, wherein said absorbing space comprises a dry, active ingredient is included in a middle layer formed of a second bonded highloft nonwoven sheet.

3. The particle entrapment pad of claim 1, wherein said absorbing agent comprises a dry, active ingredient that is selected from a group consisting of: baking soda, an anti-microbial agent, a superabsorbant polymer, a disinfectant, silica gel, an antifungal agent, a fragrance, and an odor-counteractive agent.

4. The particle entrapment pad of claim 2, wherein said second bonded highloft nonwoven sheet is more dense than said first highloft nonwoven top sheet.

5. A particle entrapment pad comprising:
    a liquid-impermeable back sheet;
    a first bonded highloft nonwoven top sheet;
    a second bonded highloft nonwoven middle sheet between said first highloft nonwoven top and said back sheet, and,
    a tacky material applied to at least one of said first and said second bonded highloft nonwoven top and middle sheets,
    wherein said tacky material provides a means to make spaces between bonded fibers of said first and said second bonded highloft nonwoven sheets tacky.

6. The particle entrapment pad of claim 5, further comprising a dry, active ingredient that acts as a water absorbing agent is contained within said bonded fibers of said second highloft nonwoven middle sheet.

7. The particle entrapment pad of claim 6, wherein said dry, active ingredient is selected from a group consisting of baking soda, an anti-microbial agent; a superabsorbant polymer, a disinfectant, silica gel, an antifungal agent, a fragrance, and an odor-counteractive agent.

8. The particle entrapment pad of claim 5, wherein said second bonded highloft nonwoven sheet is more dense than said first bonded highloft nonwoven top sheet.

9. A particle entrapment pad comprising:
    a first bonded highloft nonwoven back sheet;
    a second bonded highloft nonwoven top sheet, said second bonded highloft nonwoven top sheet is adhered to said first bonded highloft nonwoven sheet;
    wherein said first bonded highloft nonwoven back sheet is more dense than said second bonded highloft nonwoven top sheet; and
    a tacky material applied to said first and said second bonded highloft nonwoven sheets, said tacky material provides a means to make spaces between crosslinking fibers of said first and said second bonded highloft nonwoven sheets tacky.

10. The particle entrapment pad of claim 9, further comprising a dry, active ingredient contained within spacing formed between bonded fibers of said first and said second bonded highloft nonwoven sheets.

* * * * *